US011666150B2

United States Patent
Mort et al.

(10) Patent No.: US 11,666,150 B2
(45) Date of Patent: Jun. 6, 2023

(54) CHARGING DEVICE AND CABINET (71) Applicant: Robern, Inc., Bristol, PA (US)

(72) Inventors: Jason Mort, Spring City, PA (US); Brian Whetstone, Kimberton, PA (US); Linda Yang, Plymouth Meeting, PA (US); George Wahlgren, Medford Lakes, NJ (US); Howard Katz, Riegelsville, PA (US); James A. DeHope, Hatboro, PA (US); Harshil N. Patel, Mount Laurel, NJ (US)

(73) Assignee: Robern, Inc.

( * ) Notice: Subject to any disclaimer, the term of this patent is extended or adjusted under 35 U.S.C. 154(b) by 167 days.

(21) Appl. No.: 17/128,695

(22) Filed: Dec. 21, 2020

(65) Prior Publication Data

US 2021/0212467 A1 Jul. 15, 2021

Related U.S. Application Data (60) Provisional application No. 62/960,232, filed on Jan. 13, 2020.

(51) Int. Cl.
*F21V 33/00* (2006.01)
*A47B 97/00* (2006.01)
(Continued)

(52) U.S. Cl.
CPC ............... *A47B 97/00* (2013.01); *F16B 1/00* (2013.01); *F21V 23/0471* (2013.01);
(Continued)

(58) Field of Classification Search
CPC ............ A47B 97/00; A47B 2220/0077; A47B 2220/0091; F16B 1/00; F16B 2001/0035;
(Continued)

(56) References Cited

U.S. PATENT DOCUMENTS 5,032,957 A 7/1991 Canfield
5,355,627 A 10/1994 Katz
(Continued)

FOREIGN PATENT DOCUMENTS

CN 101466290 A 6/2009
CN 101866736 A 10/2010
(Continued)

OTHER PUBLICATIONS

Chinese Office Action 202110041948.1 dated Nov. 23, 2022; English Summary of Notification.

*Primary Examiner* — Y M. Quach Lee
(74) *Attorney, Agent, or Firm* — The Belles Group, P.C.

(57) ABSTRACT

In one embodiment, the present disclosure is directed to a cabinet having a charging device. The cabinet's housing has a cavity, a door configured both to close to cover the cavity and to open to expose the cavity, and shelves extending horizontally across the cavity. The charging device is positioned within the cavity and includes a housing, a charger for charging an electronic device, a receiving portion configured to hold the electronic device upright, a light source configured to shine through at least a portion of the device housing to illuminate the cavity of the cabinet housing, and an electrical outlet.

19 Claims, 9 Drawing Sheets

(51) Int. Cl.
*H02J 7/00* (2006.01)
*F21V 23/04* (2006.01)
*H02J 50/10* (2016.01)
*F16B 1/00* (2006.01)
*H02J 7/02* (2016.01)

(52) U.S. Cl.
CPC .............. *H02J 7/0044* (2013.01); *H02J 7/02* (2013.01); *H02J 50/10* (2016.02); *A47B 2220/0077* (2013.01); *A47B 2220/0091* (2013.01); *F16B 2001/0035* (2013.01)

(58) Field of Classification Search
CPC ....... F21V 23/0471; H02J 7/0044; H02J 7/02; H02J 50/10
See application file for complete search history.

(56) References Cited

U.S. PATENT DOCUMENTS

| | | | |
|---|---|---|---|
| 6,749,319 B1 * | 6/2004 | Muse | A47B 97/00 362/802 |
| 7,850,326 B2 | 12/2010 | Herper et al. | |
| 9,644,834 B2 | 5/2017 | Cano et al. | |
| 9,675,172 B2 | 6/2017 | Pandorf et al. | |
| 10,030,855 B1 * | 7/2018 | Khubani | F21L 4/027 |
| 10,582,769 B2 | 3/2020 | Stanley, Jr. et al. | |
| 2004/0069916 A1 * | 4/2004 | Cohen | G09F 7/04 248/230.8 |
| 2007/0241259 A1 | 10/2007 | Pandorf et al. | |
| 2014/0036518 A1 * | 2/2014 | Schaak | B43M 99/006 362/410 |
| 2016/0164326 A1 * | 6/2016 | Chen | H02J 7/0047 320/107 |
| 2017/0067625 A1 * | 3/2017 | Edgar | F21S 6/002 |
| 2017/0181541 A1 | 6/2017 | Stanley, Jr. et al. | |
| 2018/0287425 A1 | 10/2018 | Mortun | |

FOREIGN PATENT DOCUMENTS

| | | |
|---|---|---|
| CN | 202153644 U | 2/2012 |
| CN | 102384395 A | 3/2012 |
| CN | 202917828 U | 5/2013 |
| CN | 103904701 A | 7/2014 |
| CN | 106490863 | 3/2017 |
| CN | 107041640 A | 8/2017 |
| CN | 206673658 U | 11/2017 |
| CN | 206880437 | 1/2018 |
| CN | 207285974 | 5/2018 |
| KR | 20140005456 | 1/2014 |

* cited by examiner

CHARGING DEVICE AND CABINET

CROSS REFERENCE TO RELATED APPLICATIONS

The present application claims the benefit of U.S. Provisional Patent Application No. 62/960,232 filed on Jan. 13, 2020, which is incorporated herein by reference in its entirety.

BACKGROUND

Medicine cabinets are well-known for storing personal belongings and providing a mirrored exterior surface. Such cabinets typically take up valuable wall space in a room, however, while providing only storage and mirror capabilities. As technological advances make people more dependent upon electronic devices, a need exists for a cabinet that provides various functionalities related to those electronic devices.

BRIEF SUMMARY

The present disclosure may be directed, in one aspect, to a cabinet including a housing including a cavity, a door configured both to close to cover the cavity and to open to expose the cavity, and shelves extending horizontally across the cavity; and a charging device positioned within the cavity, the charging device including a housing; a charger for charging an electronic device; a receiving portion configured to hold the electronic device upright; a light source configured to shine through at least a portion of the housing to illuminate the cavity; and an electrical outlet.

In another aspect, the present disclosure may be directed to a charging device including a housing; a charger for charging an electronic device; a receiving portion configured to hold the electronic device upright; a light source configured to shine through at least a portion of the housing; and an electrical outlet.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

In the following description, where circuits are shown and described, one of skill in the art will recognize that, for the sake of clarity, not all peripheral circuits or components are shown in the figures or described in the description. Further, the terms "couple" and "operably couple" can refer to a direct or indirect coupling of two components of a circuit.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Figure 1:
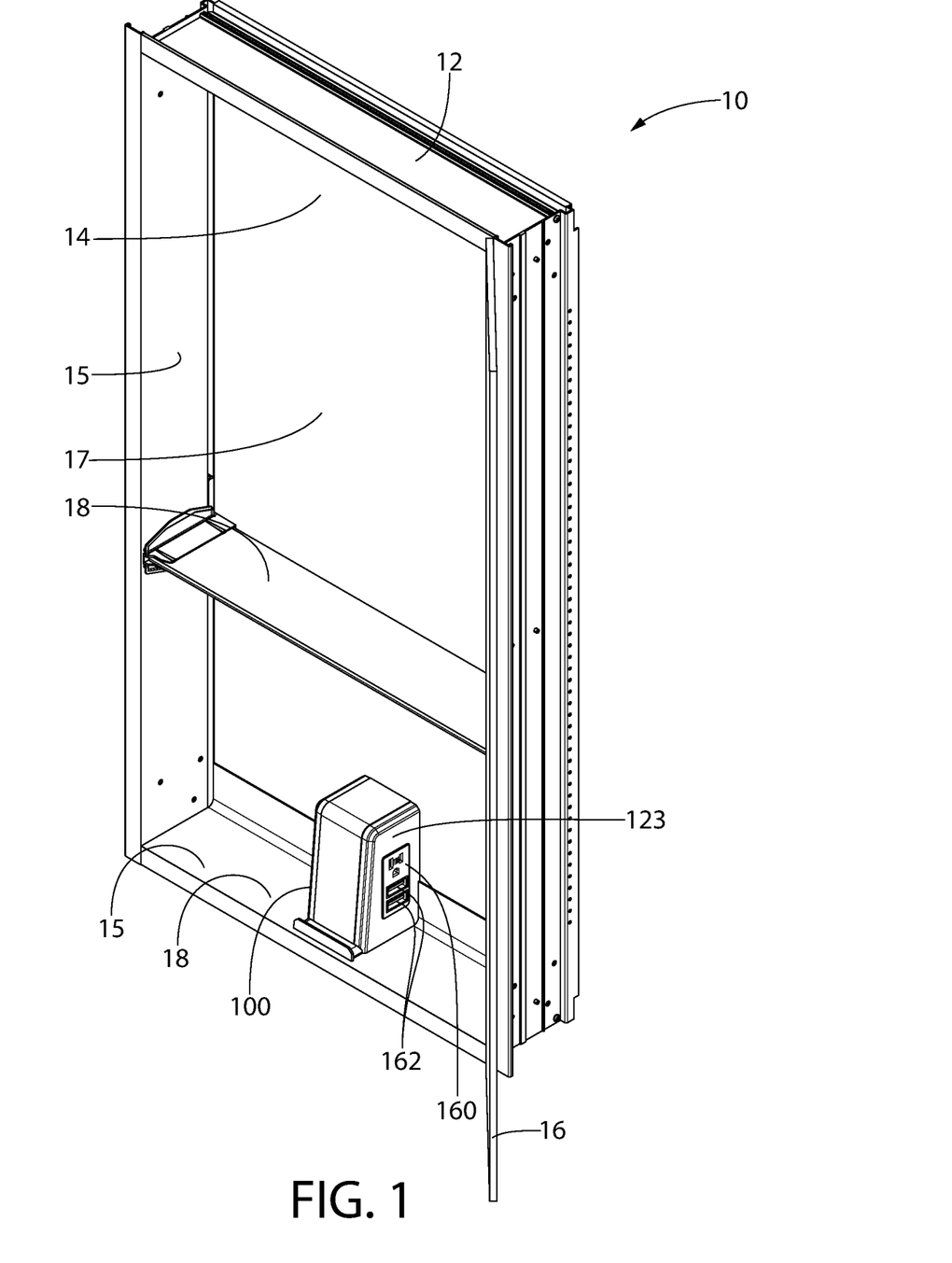
FIG. 1 is a perspective view of an open cabinet with a charging device, according to one embodiment.

Referring to FIGS. 1-4 concurrently, a storage cabinet 10 and its charging device 100 are shown. FIG. 1 is a perspective view of the open cabinet 10 with the charging device 100 on a shelf 18, according to one embodiment. The cabinet 10 may be used as a storage system for a bedroom or bathroom to store medicine or other personal items. While in the exemplified embodiment the cabinet is a storage cabinet, it should be appreciated that the cabinet can be any type of cabinet or storage space, such as a kitchen cabinet, medicine cabinet, a tool chest, a cupboard, a pantry, or other type of storage unit known in the art. The exemplified cabinet 10 includes a housing 12 having a cavity 14, a door 16 configured to both close to cover the cavity 12 and to open to expose the cavity 12, and shelves 18 extending horizontally across the cavity 12. In certain embodiments, the door 16 may be a mirrored door such that one or both of the outer and inner surfaces of the door 16 are mirrored surfaces. Further, the exemplified cavity 12 is defined by four interior walls 15 and a rear surface 17. The rear surface 17 could be of a reflective material such as a mirror; however, the invention is not to be so limited, as any surface of the cabinet may be unmirrored or mirrored. While the cabinet 10 of the exemplified embodiment has two shelves 18, the cabinet 10 of the claimed invention could have any number of shelves.

The exemplified charging device 100 sits on the bottom wall of the housing 12, which also functions as a shelf 18. In other embodiments, the charging device may be fixed to the cabinet or may sit on a different shelf 18 of the cabinet.

Further, the charging device is not limited to being within a cabinet, and instead could be placed on a counter or desk. As will be discussed further below, the charging device 100 may include a housing 104, a receiving portion 150, a charger 106 (see FIG. 9) for charging an electronic device 102, a light source 108 (see FIGS. 8 and 9) configured to shine through at least a portion of the housing 104 to illuminate the cavity 14, and at least one electrical outlet 160.

The housing 104 of the exemplified charging device 100 includes a top 120, a base 121, and four sides 122-125, though in other embodiments the charging device may be of various geometric shapes to accommodate other or additional features. The first side 122 of the exemplified housing 104 extends from the base at an acute angle such that it can engage an electronic device in an upright position. While the exemplified embodiment sets the first side 122 at a certain angle, the first side may be configured to any angle less than or equal to 90 degrees, such that an electronic device can sit upright against the first side 122 and within a receiving space 158. Further, the remaining sides 123-125 extend substantially perpendicular from the base 121 and engage with the top 120 to form a closed geometric figure.

As shown in FIG. 1, the second side 123 includes a standard electrical outlet 160 for powering electrical devices including grooming appliances, such as, but not limited to, an electric toothbrush or an electric shaver. These appliances can remain plugged-in to the electrical outlets 160 for charging or convenience when the cabinet door 16 is closed. Further, the exemplified second side 123 includes two Universal Serial Bus (USB) ports 162 to provide direct current to devices plugged into them. In other embodiments, the charging device may provide other combinations of outlets and various ports, and they may be provided on different sides or surfaces of the charging device.

Figure 2:
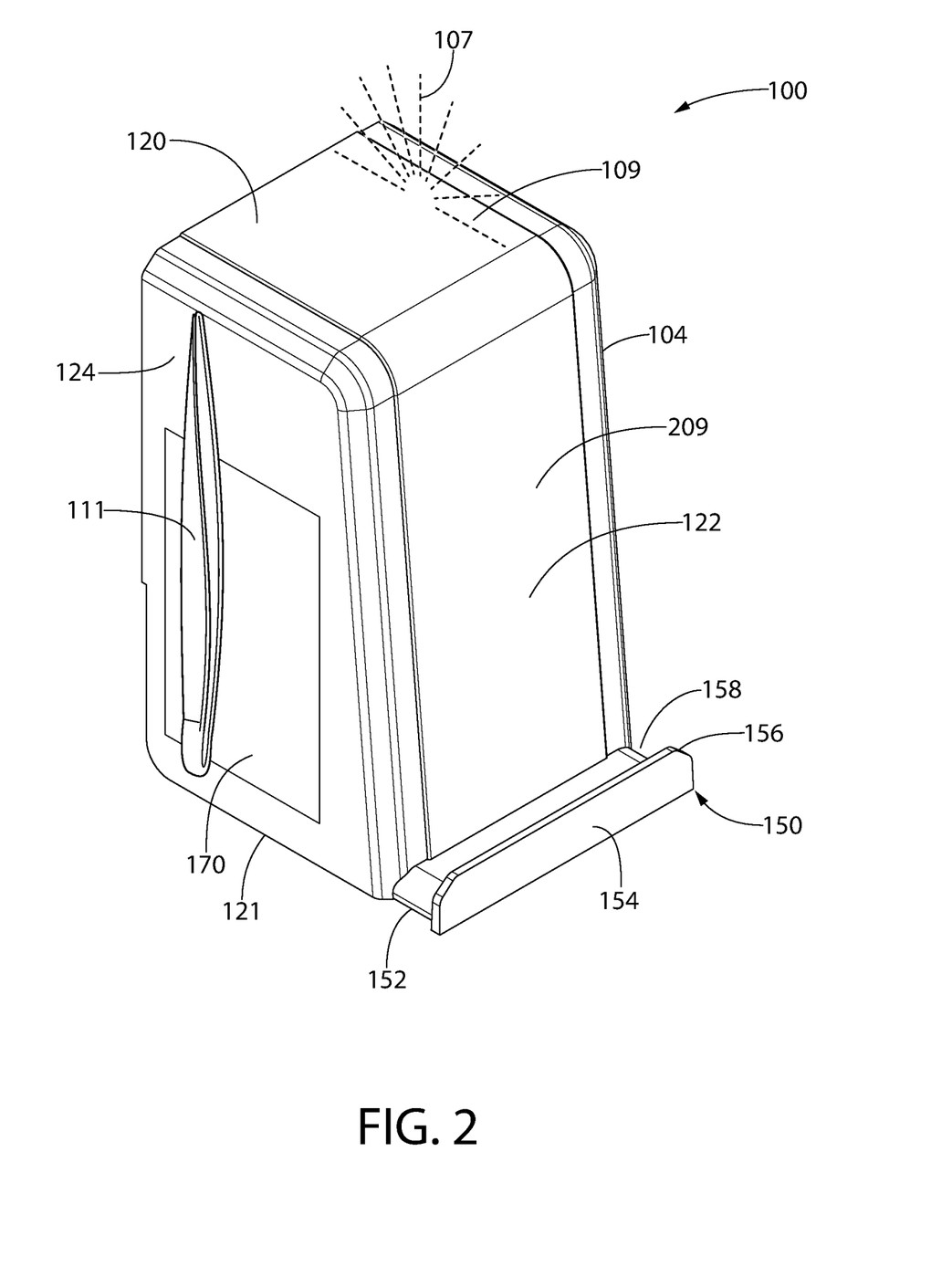
FIG. 2 is a perspective view of the charging device of FIG. 1.

Further, as shown in FIG. 2, the third side 124 of the exemplified charging device 100 includes a magnetic surface 170 for holding one or more ferromagnetic items 111. Ferromagnetic items may be any items that have a high susceptibility to magnetization, such as metal tweezers or nail clippers. However, in other embodiments, any side of the charging device may contain hooks, pegs, or any other type of fastener known in the art to hold accessories such as tweezers or nail clippers. In yet other embodiments, such fasteners and magnetic surfaces may be omitted.

Figure 3:
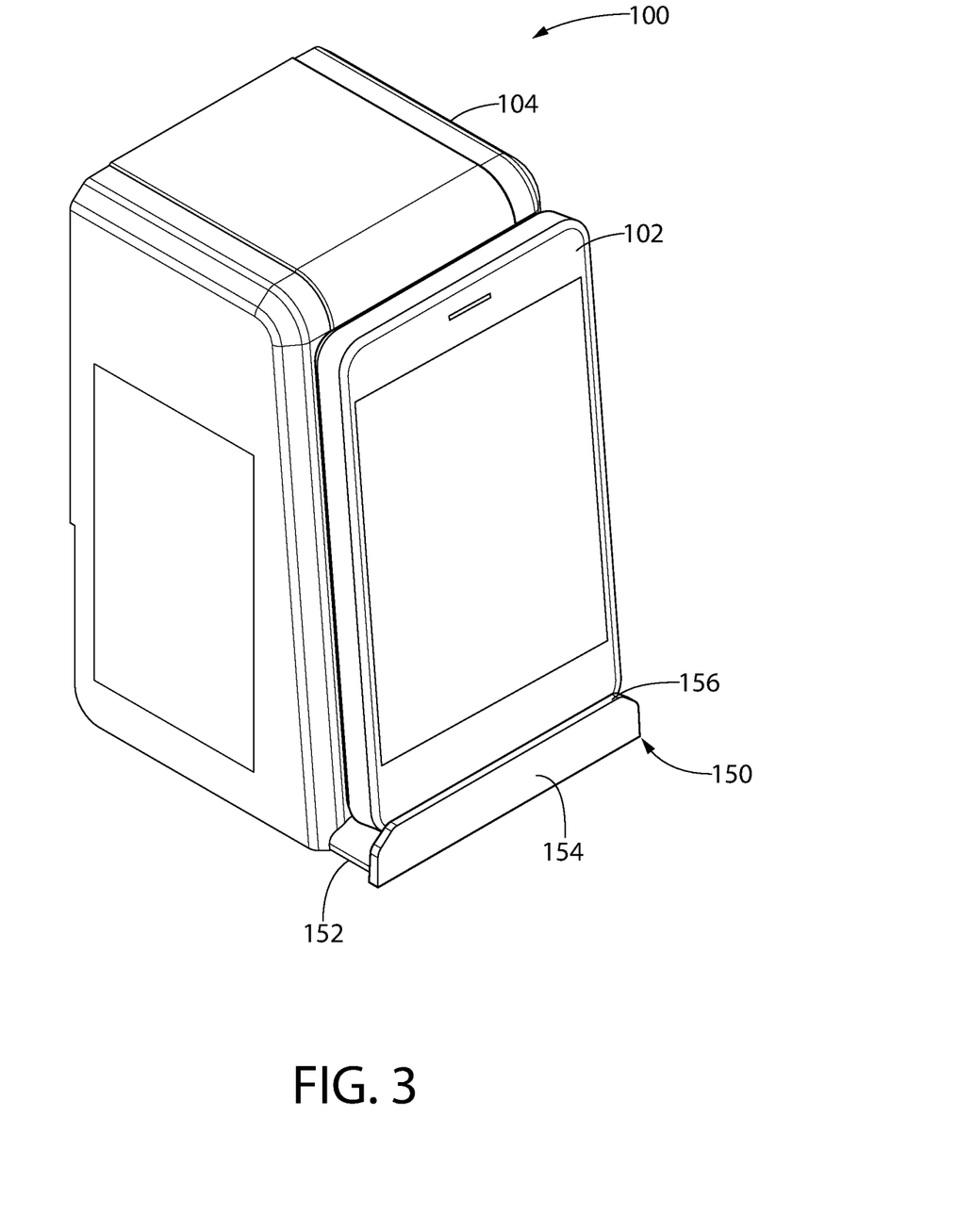
FIG. 3 is a perspective view of the charging device of FIG. 1 holding an electronic device.
Figure 4:
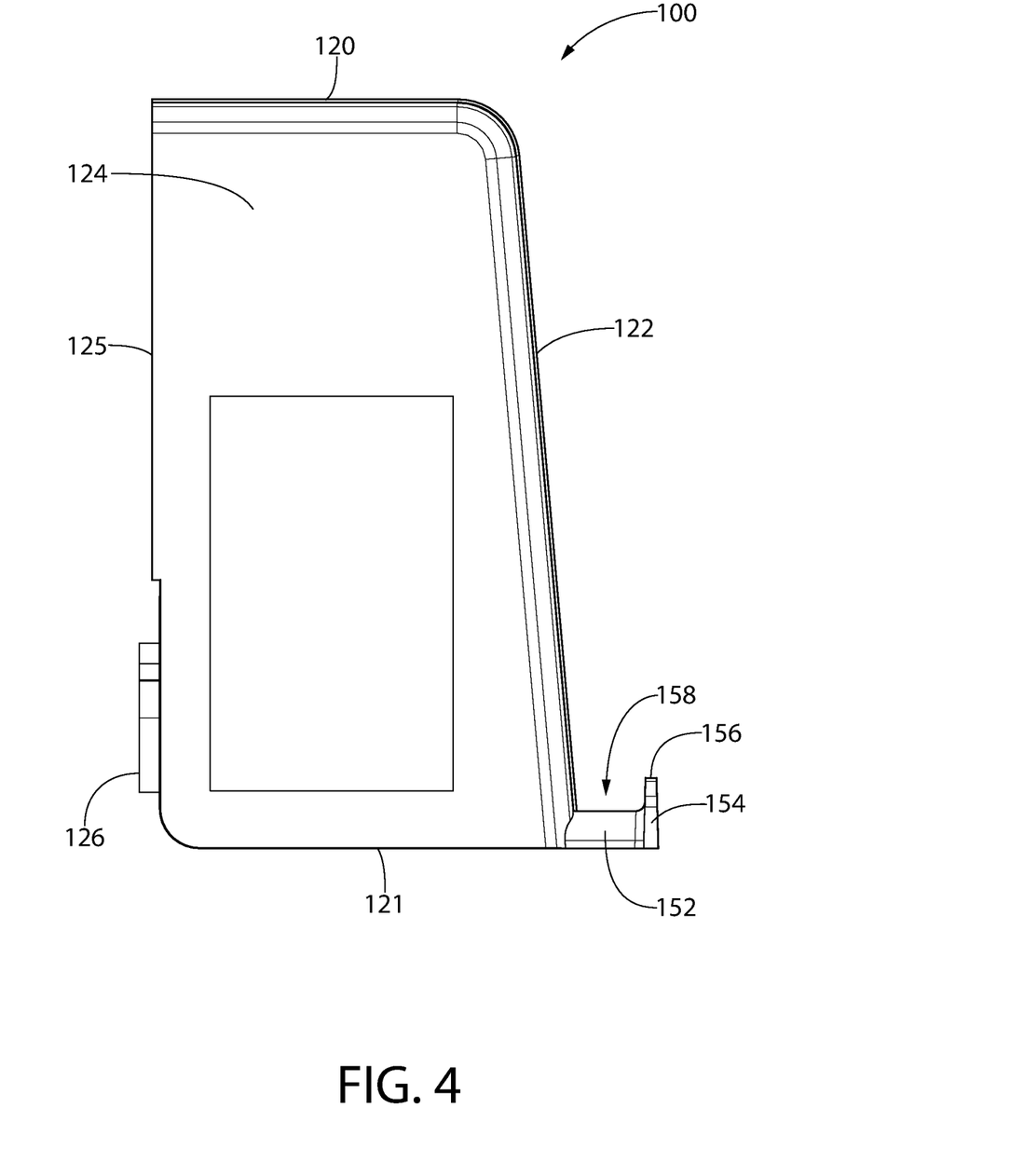
FIG. 4 is a side view of the charging device of FIG. 1.

Referring to FIGS. 3-4, the receiving portion 150 is configured to hold an electronic device upright against the first side 122 of the housing 104. The receiving portion 150 of the exemplified embodiment comprises a first section 152 and a second section 154, together making a general L-shape. The first section 152 extends parallel from the base 121 to a lateral distance that is sufficient to store an electronic device. The second section 154 extends substantially perpendicular from the end of the first section 152, which is opposite of the base 121, to a free end 156. The lateral distance between the second section 154 and the first side 122 of the housing 104 defines a receiving space 158. The length of the receiving space 158 is sufficient such that an electronic device can fit within the space and rest in an upright position on the first section 152 and against the first side 122. In another embodiment, the receiving portion 150 can be of a different shape such as but not limited to an arc, hook, or any other shape that can create a receiving space 158 to engage an electronic device. The receiving portion 150 may be an attachment to the housing 104, and alternatively may form part of the housing 104.

In the exemplified embodiment, the first side 122 and the top 120 are made of translucent material such that light 107 from a light source 108 may pass through. Conversely, the remaining sides 123-125 and base 121 are made of opaque material to prevent light from passing through. However, in another embodiment any portion of the housing may be made of translucent material such that the light 107 from the light source 108 may pass through.

In the exemplified embodiment, the light source may shine light 107 through a first illumination area 109 on the top 120 of the housing 104. The light source may also (or alternatively) shine light through a second illumination area 209 on side surface 122 of the housing 104. As will be discussed further below, the charging device may further comprise a sensor such that the light source turns ON when the sensor detects the door 16 is open. In the exemplified embodiment, the sensor is a high-frequency microwave sensor coupled to a microcontroller that activates and deactivates an array of light emitting diodes (LEDs) based on the reflected patterns of the frequency waves being emitted by the sensor. In other embodiments, the sensor may use infrared, ultrasonic, or any other suitable technology for detecting an open position of a cabinet door.

FIG. 4 further shows that the fourth side 125 may include an opening 126 for enabling the charging device 100 to receive AC mains electricity. In other embodiments, the charging device may receive power from other sources, such as another electronic device, a rechargeable battery, or another wireless charger.

Figure 5:
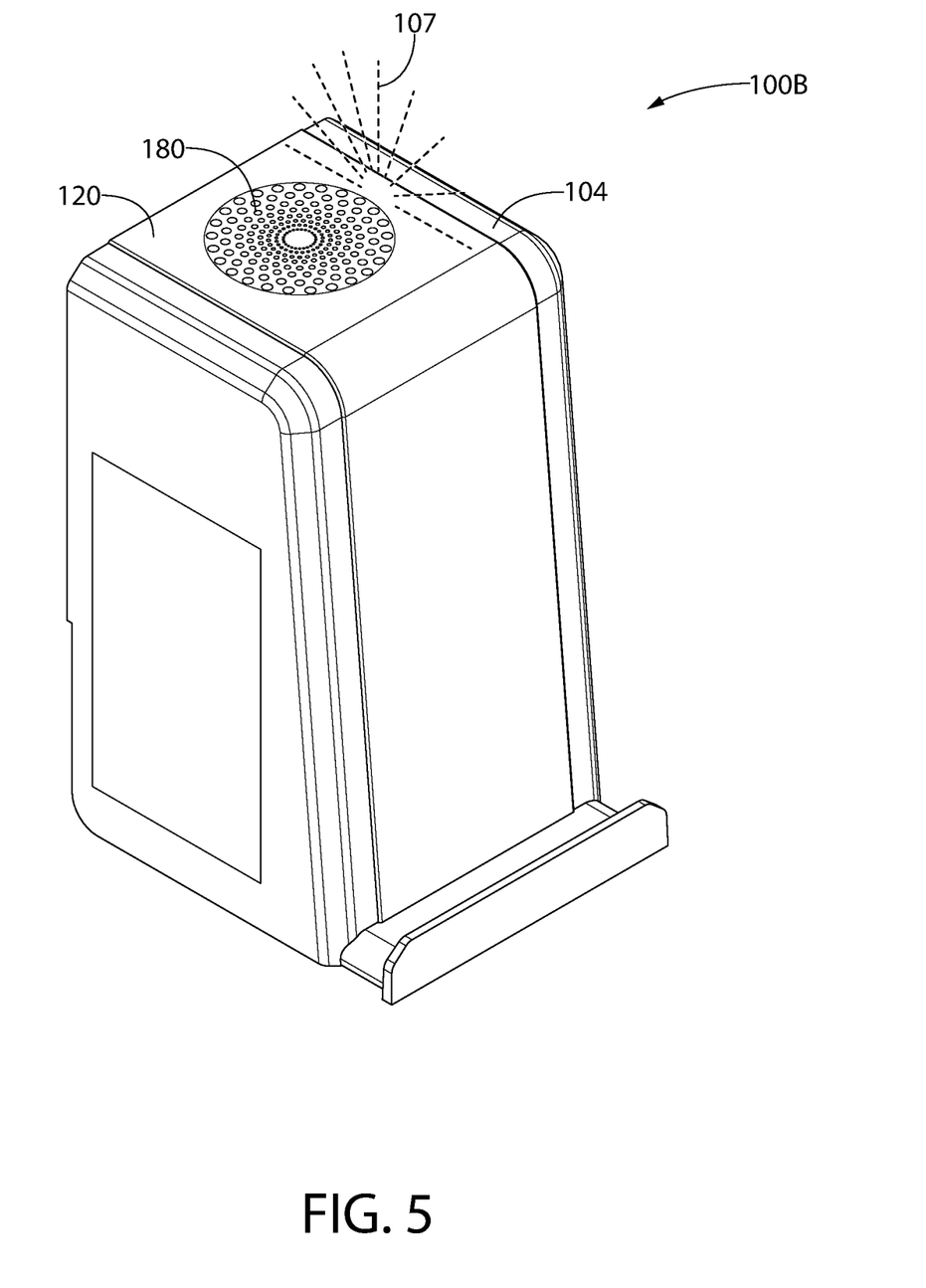
FIG. 5 is a perspective view of a charging device according to another embodiment, the charging device including a speaker.

FIG. 5 is a perspective view of a charging device 100B according to another embodiment. This embodiment is similar to the charging device 100, but includes a speaker 180 on the top side 120 of the housing 104. The top side may also emit light 107 and with charging device 100. In other embodiments, the speaker may be positioned at other areas of the charging device, such as the second side 123 or the third side 124. In the exemplified embodiment, the charging device 100B wirelessly receives data from an electronic device, including audio data for playing audio from the electronic device, using Bluetooth communication, but the invention is not so limited.

Figure 6:
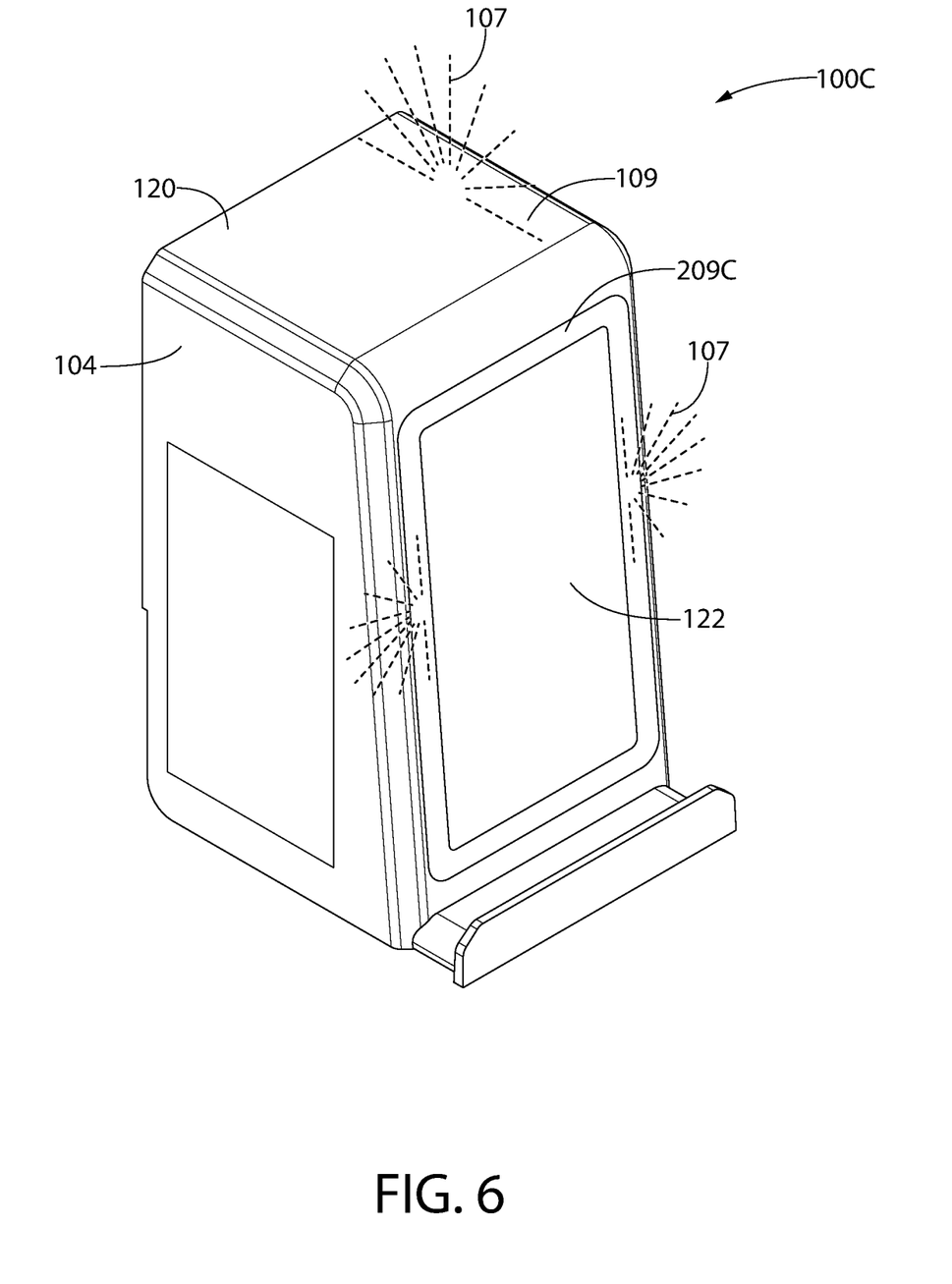
FIG. 6 is a perspective view of a charging device according to another embodiment, the charging device including an alternative illumination area on the front surface of the charging device.

FIG. 6 is a perspective view of a charging device 100C according to another embodiment. This embodiment is similar to the charging device 100, but includes an alternative illumination area 209C on the front surface. As with charging device 100, a first illumination area 109 emits light 107 from a top side 120 of the charging device. But second illumination area 209C is located around a perimeter of first side 122, thus focusing its light around the edges of where an electronic device would be located. The invention is not so limited, however, as the illumination areas can be of various shapes in various locations.

Figure 7:
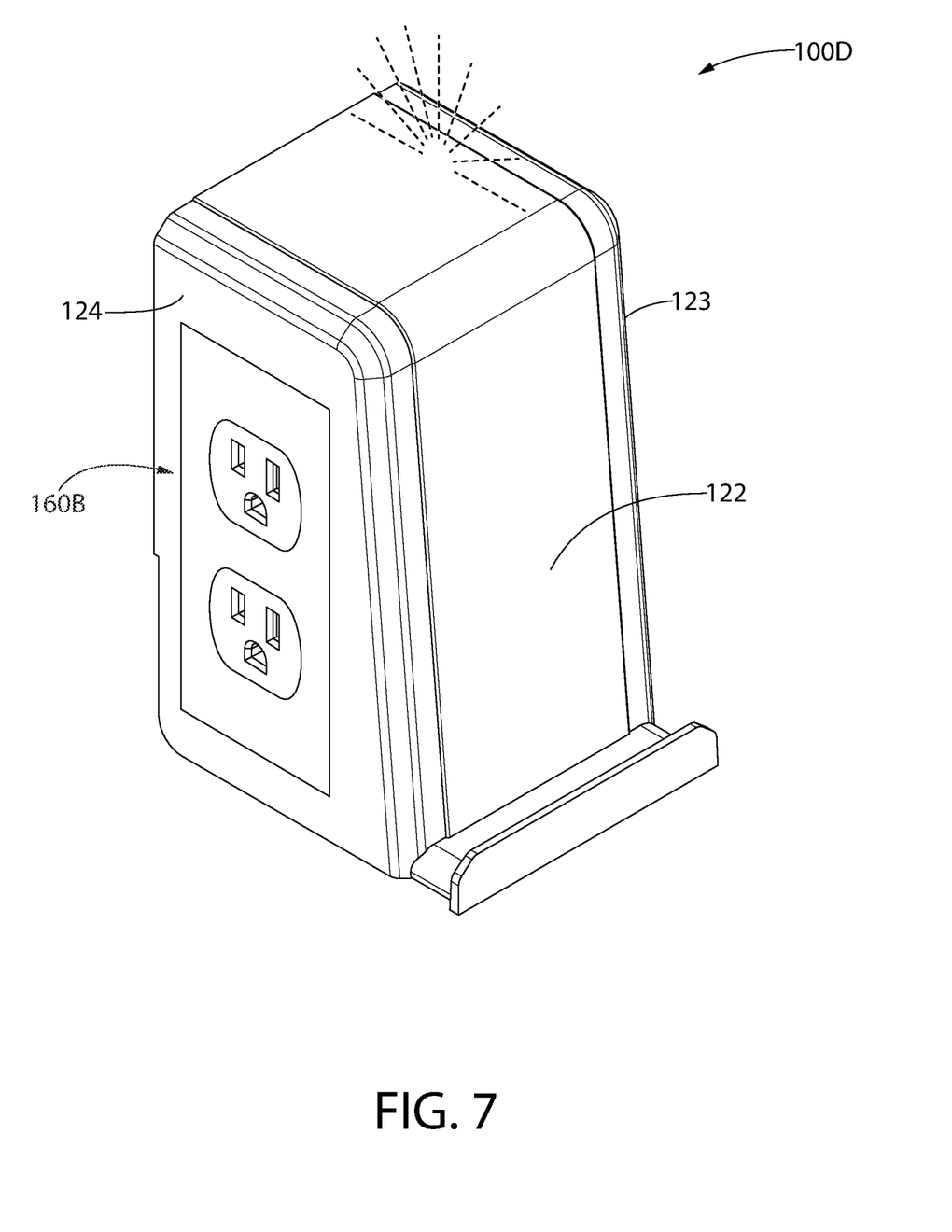
FIG. 7 is a perspective view of a charging device according to another embodiment, the charging device including a duplex electrical outlet.

FIG. 7 is a perspective view of a charging device 100D according to another embodiment. The exemplified charging device is similar to the charging device 100, but includes a duplex electrical outlet 160D on the third side 124. The charging device 100D may further include a similar duplex electrical outlet on the second side 123. In other embodiments, the first and second sides may have any combination of the features discussed herein.

Figure 8:
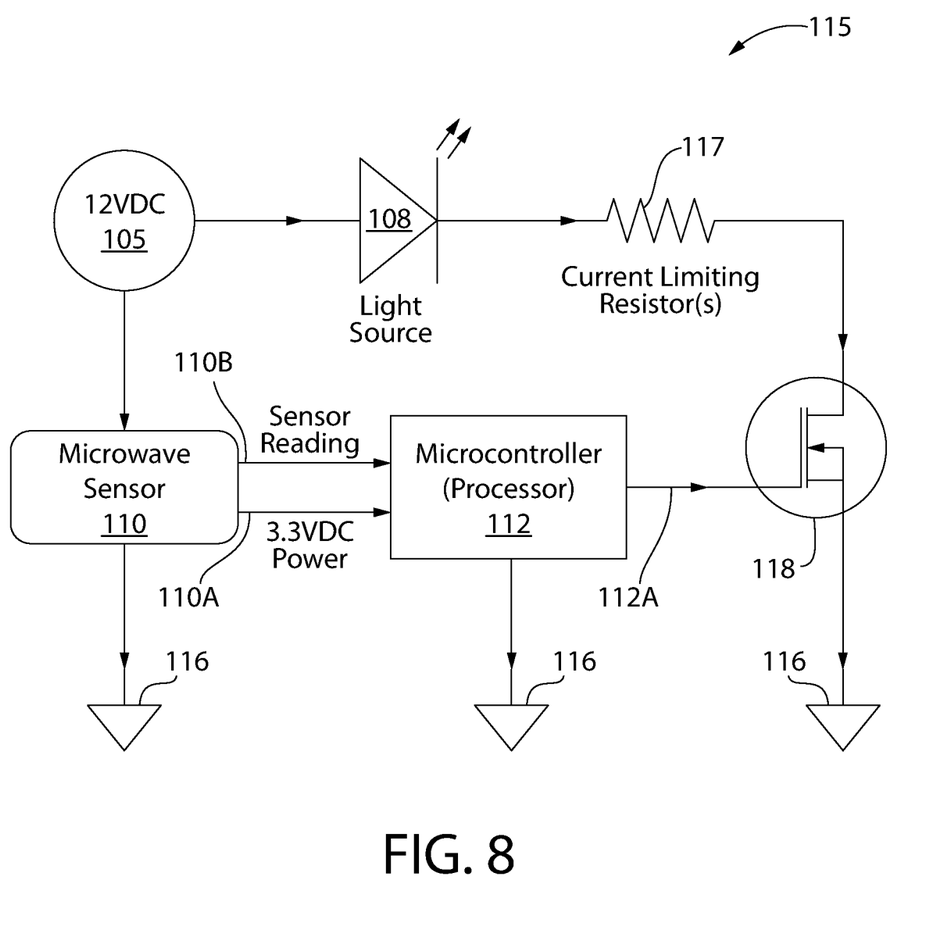
FIG. 8 is a control circuit for controlling the light emitted by a charging device according to one embodiment.

FIG. 8 is a circuit 115 for controlling the light emitted by a charging device according to one embodiment. The exemplified power supply 105 comprises a driver that converts 110 VAC to 12 VDC. The exemplified microwave sensor 110 accepts the 12 VDC from the power supply 105 and outputs at output 110A a regulated 3.3 VDC. This output is used as the voltage source for the processor 112 (in the exemplified embodiment a microcontroller). The microcontroller 112 further accepts from output 110B of the microwave sensor 110 a sensor output. Using the received sensor output and programmed logic, the microcontroller 112 provides an output at output 112A that is used to control the LED drive transistor 118. In the exemplified circuit 115, the output 112A from the microcontroller 112 is used to switch the LED drive transistor 118, which connects and disconnects the 12 VDC from the light source 108. The transistor 118 will connect the 12 VDC to the light source 108 when the sensor 110 receives information that the cabinet door 16 is in the open position, and the light source will emit light. Conversely, when the sensor receives information that the cabinet door 16 is in the closed position, the transistor 118 will disconnect the 12 VDC to the light source 108, and no light will be emitted.

The exemplified transistor 118 is a MOSFET for controlling the current flow through the light source 108. The exemplified transistor 118 allows high currents to be controlled using relatively low input/control currents provided by the microcontroller 112. While the circuit 115 shows the light source being a single LED 108 with a corresponding limiting resistor 117, the control circuit 115 may include an array of LEDs and corresponding resistors. In one embodiment, there are four LEDs and four resistors, with each of the four LED-transistor pairs connected in series as depicted in FIG. 8. The exemplified sensor 110, microcontroller 112, and drive transistor 118 are all coupled to ground 116. In other embodiments, other light sources and/or other circuits or components may be used for controlling the light emitted by the charging device. For example, an alternative power supply and/or a different type of sensor may be used. The invention is not limited to one particular type of method or circuit for controlling light emitted.

Figure 9:
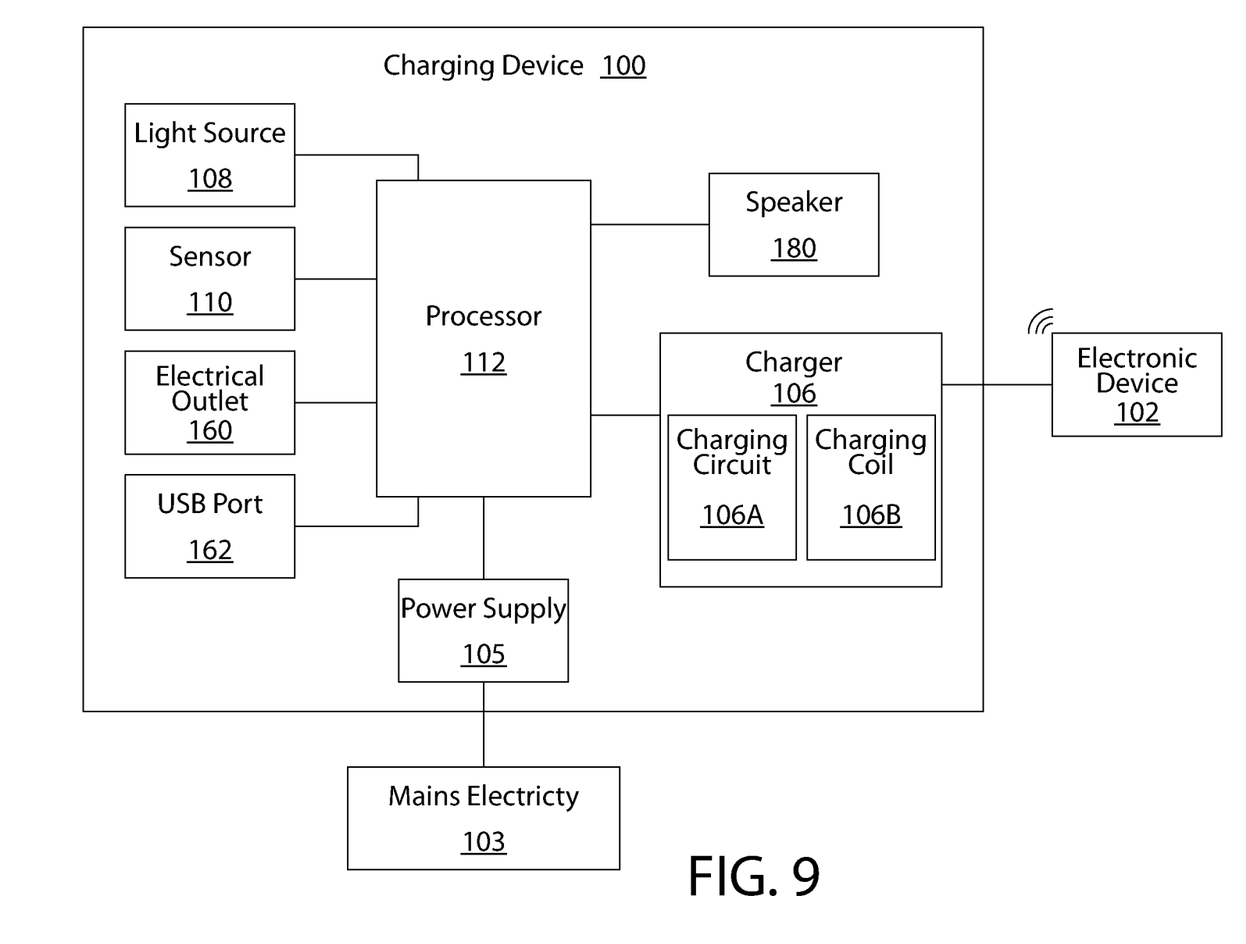
FIG. 9 is a block diagram of a charging device according to one embodiment.

FIG. 9 is a block diagram of a charging device 100 according to one embodiment. The exemplified charging device 100 includes various components discussed above. The power supply 105 is connected to mains electricity 103. The charger 106 provides power to electronic device 102. Further, the charging device 100 can wirelessly receive data from the electronic device, including audio data for playing audio from the electronic device (e.g., using Bluetooth communication or Wi-Fi).

The charger 106 includes a charging circuit 106A. The charging circuit may be powered by input power supply from an AC power input, DC power, or other power source. The charger then uses the input power supply to charge an electronic device. In the exemplified embodiment, when an electronic device such as a mobile phone, computing device, camera, or other mobile device is placed within the receiving space of the charging device, the charging circuit generates a current in a receiver coil of the electronic device. The exemplified charger 106 includes an inductive coil 106B so that the charging circuit 200 can inductively charge an electronic device that is operably coupled to the charger 106. In the exemplified embodiment, the inductive coil 106B located within the charging device (e.g., within first side 124 of FIGS. 1-4) and functions by producing an electromagnetic field that generates a current in a receiving coil of a compatible electronic device. The charging circuit 106A can be configured to detect a receiver and/or turn the applied power ON or OFF. The current in the receiving coil is utilized to charge the electronic device.

The embodiments discussed above provide several advantages. For example, the charging devices enable a cabinet to provide various additional functions, such as device charging, power outlets and USB ports, lighting triggered by an open door, ferromagnetic item holding, and a speaker. The exemplified charging devices take cabinets beyond their typical role of providing only storage and a mirror.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A cabinet comprising:
   a cabinet housing comprising:
      a cavity;
      a door configured both to close to cover the cavity and to open to expose the cavity; and
      shelves extending horizontally across the cavity; and
   a charging device positioned within the cavity, the charging device comprising:
      a device housing;
      a charger for charging an electronic device, the charger disposed in at least a portion of the device housing;
      a receiving portion of the device housing configured to hold the electronic device upright;
      a light source disposed at least partially within the device housing, the light source configured to shine through at least a portion of the device housing to illuminate the cavity of the cabinet housing; and
      an electrical outlet disposed in a least a portion of the device housing.

2. The cabinet of claim 1 wherein the charging device is positioned on one of the shelves.

3. The cabinet of claim 1:
   wherein the device housing comprises a plurality of sides and a base;
   wherein the receiving portion of the charging device extends from the base of the device housing and comprises a first section and a second section; and
   wherein the first section of the receiving portion is parallel to and connected to the base of the device housing, and the second section is substantially perpendicular to the first section and extends to a free end having a distance from the base that is large enough to engage the electronic device.

4. The cabinet of claim 1:
   wherein the device housing comprises a first side and a separate and distinct second side;
   wherein the receiving portion is disposed on the first side; and
   wherein the electrical outlet is disposed on the second side.

5. The cabinet of claim 4 wherein the device housing further comprises a separate and distinct third side having a magnetic surface for holding ferromagnetic items.

6. The cabinet of claim 1:
   wherein the device housing comprises a first side, a second side, and a third side;
   wherein the receiving portion is disposed on the first side;
   wherein the electrical outlet forms part of a duplex electrical outlet that is disposed on the second side; and
   wherein a second duplex electrical outlet is disposed on the third side.

7. The cabinet of claim 1 wherein the receiving portion forms part of the device housing.

8. A charging device comprising:
   a device housing;
   a charger for charging an electronic device, the charger disposed in at least a portion of the device housing;
   a receiving portion of the device housing configured to hold the electronic device upright;
   a light source disposed at least partially within the device housing, the light source configured to shine through at least a portion of the device housing to illuminate at least some of an exterior of the device housing; and
   an electrical outlet disposed in at least a portion of the device housing.

9. The charging device of claim 8:
   wherein the device housing comprises a plurality of sides and a base;
   wherein the receiving portion of the charging device extends from the base of the device housing and comprises a first section and a second section; and
   wherein the first section of the receiving portion is parallel to and connected to the base of the device housing, and the second section is substantially perpendicular to the first section and extends to a free end having a distance from the base that is large enough to engage the electronic device.

10. The charging device of claim 8:
    wherein the device housing comprises a first side and a separate and distinct second side;
    wherein the receiving portion is disposed on the first side; and
    wherein the electrical outlet is disposed on the second side.

11. The charging device of claim 10 wherein the device housing further comprises a separate and distinct third side having a magnetic surface for holding ferromagnetic items.

12. The cabinet of claim 8:
    wherein the device housing comprises a first side, a second side, and a third side;
    wherein the receiving portion is disposed on the first side;
    wherein the electrical outlet forms part of a duplex electrical outlet that is disposed on the second side; and
    wherein a second duplex electrical outlet is disposed on the third side.

13. The charging device of claim 8 wherein the receiving portion forms part of the device housing.

14. The charging device of claim 8 further comprising a sensor disposed in at least a portion of the device housing, the light sensor turning ON when the sensor detects motion.

15. The charging device of claim 14 wherein the sensor is a high-frequency microwave sensor.

16. The charging device of claim 8 further comprising a USB port disposed in at least a portion of the device housing.

17. The charging device of claim 8 wherein the charger is an inductive charger.

18. The charging device of claim 8 further comprising a speaker disposed in at least a portion of the device housing, the speaker configured to receive data from the electronic device.

19. The charging device of claim 18 wherein the speaker comprises a wireless communication system for the reception of the data from the electronic device.

* * * * *